US012472733B2

(12) United States Patent
Jung et al.

(10) Patent No.: US 12,472,733 B2
(45) Date of Patent: Nov. 18, 2025

(54) ACRYLIC LAMINATE FILM, METHOD FOR PRODUCING SAME, AND DECO SHEET PRODUCED THEREFROM

(71) Applicant: LG MMA CORP CO., LTD., Yeosu-si (KR)

(72) Inventors: Yo Han Jung, Daejeon (KR); Young Soo Lee, Daejeon (KR); Eun Jin Jeon, Daejeon (KR)

(73) Assignee: LG MMA CORP CO., LTD., Yeosu-si (KR)

( * ) Notice: Subject to any disclaimer, the term of this patent is extended or adjusted under 35 U.S.C. 154(b) by 785 days.

(21) Appl. No.: 17/427,059

(22) PCT Filed: Dec. 20, 2019

(86) PCT No.: PCT/KR2019/018157
§ 371 (c)(1),
(2) Date: Apr. 6, 2022

(87) PCT Pub. No.: WO2020/130700
PCT Pub. Date: Jun. 25, 2020

(65) Prior Publication Data
US 2023/0226808 A1    Jul. 20, 2023

(30) Foreign Application Priority Data
Dec. 20, 2018 (KR) .......... 10-2018-0165948

(51) Int. Cl.
| | | |
|---|---|---|
| B32B 27/08 | (2006.01) |
| B32B 27/30 | (2006.01) |
| C08F 2/26 | (2006.01) |
| C08F 212/08 | (2006.01) |
| C08F 220/14 | (2006.01) |
| C08F 220/18 | (2006.01) |
| C08F 220/40 | (2006.01) |
| C08F 222/10 | (2006.01) |
| C08F 265/06 | (2006.01) |
| C08J 5/18 | (2006.01) |

(52) U.S. Cl.
CPC ............ B32B 27/308 (2013.01); B32B 27/08 (2013.01); C08F 2/26 (2013.01); C08F 212/08 (2013.01); C08F 220/14 (2013.01); C08F 220/1804 (2020.02); C08F 220/40 (2013.01); C08F 222/102 (2020.02); C08F 265/06 (2013.01); C08J 5/18 (2013.01); *B32B 2250/03* (2013.01); *B32B 2250/24* (2013.01); *B32B 2307/412* (2013.01); *B32B 2307/584* (2013.01); *B32B 2307/712* (2013.01); *B32B 2333/08* (2013.01); *B32B 2333/12* (2013.01); *B32B 2451/00* (2013.01); *C08J 2351/04* (2013.01)

(58) Field of Classification Search
None
See application file for complete search history.

(56) References Cited

U.S. PATENT DOCUMENTS

| | | | |
|---|---|---|---|
| 4,387,138 A * | 6/1983 | Gift ...................... | C08F 285/00 428/407 |
| 5,521,252 A | 5/1996 | Matsuda et al. | |
| 2017/0291216 A1* | 10/2017 | Suzuki ...................... | C08J 9/20 |

FOREIGN PATENT DOCUMENTS

| | | |
|---|---|---|
| EP | 0989144 A1 | 3/2000 |
| EP | 1964856 A1 | 9/2008 |
| JP | 201116952 A | 6/2011 |
| KR | 20120056974 A | 6/2012 |
| KR | 20130057035 A | 5/2013 |
| KR | 20140084462 A | 7/2014 |
| KR | 101473521 B1 | 12/2014 |
| RU | 2393178 C2 | 6/2010 |
| WO | 2017141873 A1 | 8/2017 |
| WO | 2017170399 A1 | 10/2017 |
| WO | 2018062784 A1 | 4/2018 |
| WO | 2018155677 A1 | 8/2018 |

OTHER PUBLICATIONS

European Patent Office, Extended European Search Report Issued in Application No. 19899210.9, Aug. 5, 2022, Germany, 9 pages.
ISA Korean Intellectual Property Office, International Search Report Issued in Application No. PCT/KR2019/018157, Jul. 21, 2020, WIPO, 3 pages.

* cited by examiner

*Primary Examiner* — Sheeba Ahmed
(74) *Attorney, Agent, or Firm* — McCoy Russell LLP

(57) ABSTRACT

The present disclosure pertains to: an acrylic laminate film containing an acrylic copolymer and having a three-layer structure of an inner layer, an intermediate layer, and an outer layer; a method for producing same; and a deco sheet produced therefrom. An object of the present disclosure is to provide a three-layer-structured acrylic laminate film produced from an acrylic copolymer. Another object of the present disclosure is to provide: an acrylic laminate film having significantly improved optical properties and surface smoothness by using an acrylic copolymer alone without mixing the same with additional polymers; and a method for producing the acrylic laminate film. Still another object of the present disclosure is to provide: an acrylic laminate film that exhibits significantly reduced whitening even when a flexural stress is applied; and a method for producing the acrylic laminate film.

13 Claims, No Drawings

US 12,472,733 B2

ACRYLIC LAMINATE FILM, METHOD FOR PRODUCING SAME, AND DECO SHEET PRODUCED THEREFROM

CROSS REFERENCE TO RELATED APPLICATIONS

The present application is a U.S. National Phase of International Application No. PCT/KR2019/018157 entitled "ACRYLIC LAMINATE FILM, METHOD FOR PRODUCING SAME, AND DECO SHEET PRODUCED THEREFROM," and filed on Dec. 20, 2019. International Application No. PCT/KR2019/018157 claims priority to Korean Patent Application No. 10-2018-0165948 filed on Dec. 20, 2018. The entire contents of each of the above-listed applications are hereby incorporated by reference for all purposes.

TECHNICAL FIELD

The present disclosure relates to an acrylic laminate film, a method for producing the same, and a deco sheet produced therefrom.

BACKGROUND AND SUMMARY

Since a product manufactured using an acrylic polymer generally shows excellent physical properties such as weatherability, scratch resistance, high transparency, and light fastness, and also has a good balance between mechanical strength and moldability, it is widely used in various fields such as the automotive industry, the optical industry, and the electrical/electronic industry as a material of various main components.

Since an acrylic polymer has excellent transparency and weatherability, it is variously used throughout industries, such as optical products and electronic product housing. For example, the acrylic polymer may be molded into a sheet or film, or may be applied by being laminated on plastic, wood, metal, or the like.

A film obtained by molding the acrylic polymer as such should have high film moldability and impact resistance and unreduced transparency upon processing, so that a film of which the thickness may be easily changed and the film formability is excellent is produced. To this end, a method of dispersing a component formed of an acrylic rubber in an acrylic polymer or using a graft copolymer itself has been widely devised.

In addition, an acrylic polymer sheet or film may be utilized mainly as a coating or decoration sheet or deco sheet for a decoration purpose in materials of furniture, sink, door, and the like.

Conventionally, a polyvinyl chloride sheet having excellent processability and elongation was used as the deco sheet, but since it has an environmental problem of producing a large amount of dioxin during incineration and is regulated worldwide, it is difficult to use the polyvinyl chloride sheet.

In order to solve the problem, a polyester sheet having excellent surface quality and high molding temperature to have excellent moldability was used, but has a high defect frequency in the sheet due to crystallization progress, because it is a crystal polymer.

In order to overcome the above problem, studies for producing a deco sheet using an acrylic polymer are being conducted.

Korean Patent Registration No. 10-1473521 issued to the present applicant discloses an acrylic laminate film including an acrylic copolymer. The patent document is provided by mixing an acrylic thermoplastic polymer and acrylic particles, but it was difficult to completely remove whitening by a process of mixing an acrylic thermoplastic polymer and acrylic particles. In addition, there was a limitation in an increase in transparency and smoothness of a film therefrom.

DISCLOSURE

Technical Problem

An object of the present disclosure is to provide an acrylic laminate film produced from an acrylic copolymer having a three-layer structure.

Another object of the present disclosure is to provide an acrylic laminate film having significantly improved optical properties and surface smoothness by using an acrylic copolymer alone without a mixing process with an additional polymer, and a method for producing the same.

Still another object of the present disclosure is to provide an acrylic laminate film having significantly improved whitening even when a flexural stress is applied, and a method for producing the same.

Technical Solution

In one general aspect, an acrylic laminate film includes: an acrylic copolymer having a three-layer structure of an inner layer, an intermediate layer, and an outer layer, wherein in the acrylic copolymer, the inner layer includes an inner layer copolymer polymerized from an inner layer composition including an acrylate monomer, a crosslinking agent, and an initiator, the intermediate layer includes an intermediate layer copolymer polymerized from an intermediate layer composition including an acrylate monomer, a methacrylate monomer, an initiator, and a crosslinking agent, and the outer layer includes an outer layer copolymer polymerized from an outer layer composition including an acrylate monomer, a methacrylate monomer, a chain transfer agent, and an initiator.

The inner layer composition according to an exemplary embodiment of the present disclosure may further include any one or two or more selected from aromatic vinyl monomers and methacrylate monomers.

The acrylic copolymer according to an exemplary embodiment of the present disclosure may include 20 to 40 wt % of the inner layer, 30 to 50 wt % of the intermediate layer, and 30 to 50 wt % of the outer layer, based on the total weight.

According to an exemplary embodiment of the present disclosure, the inner layer composition may include 100 wt % of the acrylate monomer, 50 to 90 wt % of the acrylate monomer and 10 to 50 wt % of the aromatic vinyl monomer or the methacrylate monomer, the intermediate layer composition may include 10 to 50 wt % of the acrylate monomer and 50 to 90 wt % of the methacrylate monomer, and the outer layer composition may include 10 to 50 wt % of the acrylate monomer and 50 to 90 wt % of the methacrylate monomer.

The acrylic copolymer according to an exemplary embodiment of the present disclosure may have an average particle diameter of 10 to 350 nm.

According to an exemplary embodiment of the present disclosure, the inner layer may have an average distance from a copolymer center to an outer part of the inner layer of 50 to 150 nm, the intermediate layer may have an average distance from the outer part of the inner layer to an outer part of the intermediate layer of 30 to 150 nm, and the outer layer may have an average distance from the outer part of the intermediate layer to an outermost part of 30 to 150 nm.

In another general aspect, a method for producing an acrylic laminate film includes: a) preparing an acrylic copolymer having a three-layer structure of an inner layer, an intermediate layer, and an outer layer and b) molding the acrylic copolymer by melt mixing.

Step a) according to an exemplary embodiment of the present disclosure may include a-1) performing emulsion polymerization of an inner layer composition including an acrylate monomer, a crosslinking agent, and an initiator to form the inner layer, a-2) adding an intermediate layer composition including an acrylate monomer, a methacrylate monomer, an initiator, and a crosslinking agent and performing emulsion polymerization to form the intermediate layer which coats the inner layer, and a-3) adding an outer layer composition including an acrylate monomer, a methacrylate monomer, a chain transfer agent, and an initiator and performing emulsion polymerization to form the outer layer which coats the intermediate layer, thereby preparing the acrylic copolymer having a three-layer structure. The inner layer composition of step a-1) may further include any one or two or more selected from aromatic vinyl monomers and methacrylate monomers.

In step b) according to an exemplary embodiment of the present disclosure, the molding may be performed by any one or two or more methods selected from a melt casting method, a T-die method, and a calendering method.

Another embodiment of the present disclosure is a deco sheet including the acrylic laminate film described above.

Advantageous Effects

The acrylic laminate film according to an exemplary embodiment of the present disclosure has excellent optical properties such as a high light transmittance and a low haze.

In addition, the acrylic laminate film according to an exemplary embodiment of the present disclosure may suppress whitening due to flexural stress and has excellent flexibility to be applied as a deco sheet.

In addition, the acrylic laminate film according to an exemplary embodiment of the present disclosure uses an acrylic copolymer having a three-layer structure alone to prevent whitening which may be caused when undergoing a process of mixing with an additional polymer and to have significantly improved optical properties and surface smoothness.

BEST MODE

Hereinafter, an acrylic laminate film according to the present disclosure, a method for producing the same, and a deco sheet produced therefrom will be described in detail, through exemplary embodiments. However, the following exemplary embodiments are only a reference for describing the present disclosure in detail, and the present disclosure is not limited thereto, and may be implemented in various forms.

In addition, unless otherwise defined, all technical terms and scientific terms have the same meanings as those commonly understood by one of those skilled in the art to which the present disclosure pertains. The terms used herein are only for effectively describing a certain exemplary embodiment, and not intended to limit the present disclosure.

In the present disclosure, a copolymer refers to elements mentioned as a monomer in the present disclosure being polymerized to be included as a repeating unit in a copolymer, and the copolymer in the present disclosure may be a block copolymer or a random copolymer, but is not limited thereto.

The present disclosure for achieving the above purposes relates to an acrylic laminate film, a method for producing the same, and a deco sheet produced therefrom.

Hereinafter, the present disclosure will be described in more detail.

The acrylic laminate film according to the present disclosure is produced by including an acrylic copolymer having a three-layer structure of an inner layer, an intermediate layer, and an outer layer, wherein in the acrylic copolymer, the inner layer includes an inner layer copolymer polymerized from an inner layer composition including an acrylate monomer, a crosslinking agent, and an initiator, the intermediate layer includes an intermediate layer copolymer polymerized from an intermediate layer composition including an acrylate monomer, a methacrylate monomer, an initiator, and a crosslinking agent, and the outer layer includes an outer layer copolymer polymerized from an outer layer composition including an acrylate monomer, a methacrylate monomer, a chain transfer agent, and an initiator.

The acrylic laminate film according to the present disclosure includes the acrylic copolymer having a three-layer structure, thereby significantly improving optical properties such as a light transmittance and haze, and surface smoothness. In addition, whitening caused during a mixing process may be prevented by using only the acrylic copolymer having a three-layer structure, without a need for an additional polymer, and thus, the film is more stable for whitening property by flexure. In addition, since a reduction rate of optical properties is significantly low even with a long-term use, the film may have long-term stability.

The acrylic copolymer according to the present disclosure has a three-layer structure composed of an inner layer, an intermediate layer, and an outer layer.

According to an exemplary embodiment of the present disclosure, the inner layer is a layer positioned in the center part of the acrylic copolymer, and may be formed by including an inner layer copolymer polymerized from an inner layer composition including an acrylate monomer, a crosslinking agent, and an initiator. In some embodiments, the inner layer composition may further include any one or two or more selected from an aromatic vinyl monomer and a methacrylate monomer.

According to an exemplary embodiment of the present disclosure, the acrylate monomer may be C1-C10 alkyl acrylate, and for example, may be any one or a mixture of two or more selected from methyl acrylate, ethyl acrylate, n-butyl acrylate, t-butyl acrylate, 2-ethylhexyl acrylate, and the like.

According to an exemplary embodiment of the present disclosure, the aromatic vinyl monomer may be any one or a mixture of two or more selected from styrene, α-methyl styrene, p-bromostyrene, p-methyl styrene, p-chlorostyrene, o-bromostyrene, vinyl toluene, and the like.

According to an exemplary embodiment of the present disclosure, the methacrylate monomer may be C1-C10 alkyl methacrylate, and for example, may be any one or a mixture of two or more selected from methyl methacrylate, ethyl methacrylate, n-butyl methacrylate, t-butyl methacrylate, cyclohexyl methacrylate, 2-ethylhexyl methacrylate, and the like.

According to an exemplary embodiment of the present disclosure, the crosslinking agent may include any one or a mixture of two or more selected from 1,2-ethanedioldimethacrylate, 1,2-ethanedioldiacrylate, 1,3-propanedioldimethacrylate, 1,3-propanedioldiacrylate, 1,4-butanedioldimethacrylate, 1,4-butanedioldiacrylate, 1,5-pentanedioldimethacrylate, 1,5-pentanedioldiacrylate, 1,6-henxanedioldimethacrylate, 1,6-henxanedioldiacrylate, divinylbenzene, ethylene glycol dimethacrylate, ethylene glycol diacrylate, propylene glycol dimethacrylate, propylene glycol diacrylate, butylene glycol dimethacrylate, butylene glycol diacrylate, triethylene glycol dimethacrylate, triethylene glycol diacrylate, polyethylene glycol dimethacrylate, polyethylene glycol diacrylate, polypropylene glycol dimethacrylate, polypropylene glycol diacrylate, polybutylene glycol dimethacrylate, polybutylene glycol diacrylate, allyl methacrylate, allyl acrylate, and the like.

According to an exemplary embodiment of the present disclosure, the inner layer copolymer may be polymerized by including the acrylate monomer alone as a monomer or including any one or two or more together selected from an aromatic vinyl monomer and a methacrylate monomer in the acrylate monomer. Separately, a crosslinking agent is further included, thereby preparing a crosslinked acrylic copolymer.

According to an exemplary embodiment of the present disclosure, the inner layer composition may include 100 wt % of the acrylate monomer, with respect to the total weight of the monomer and polymerize a homopolymer. In addition, a monomer mixture of 50 to 90 wt % of the acrylate monomer and 10 to 50 wt % of the aromatic vinyl monomer or the methacrylate monomer may be included. In an embodiment, a monomer mixture of 70 to 90 wt % of the acrylate monomer and 10 to 30 wt % of the aromatic vinyl monomer or the methacrylate monomer may be included. When the inner layer composition has the contents described above, optical properties may be improved while a shape of the copolymer particle is stably taken, and also interfacial bonding with the intermediate layer may be further improved to have long-term stability and impact resistance.

According to an exemplary embodiment of the present disclosure, the crosslinking agent may be included at 0.1 to 10 parts by weight with respect to 100 parts by weight of the monomer mixture. For example, the crosslinking agent may be included at 0.5 to 5 parts by weight with respect to 100 parts by weight of the monomer mixture. When the crosslinking agent is included at the content described above, it crosslinks the monomers so that the inner layer is not broken, thereby providing excellent optical properties without deterioration of the optical properties and preventing whitening even when an external force such as flexure is applied.

According to an exemplary embodiment of the present disclosure, the initiator is not limited, but specifically, for example, may include any one or a mixture of two or more selected from sulfates selected from potassium persulfate, sodium persulfate, lithium persulfate, iron sulfate, and the like, azos selected from 2,2'-azo-bis(isobutyronitrile), 2,2'-azo-bis(2,4-dimethylvaleronitrile), and 1-t-butyl-azocyanocyclohexane, and the like, peroxides such as t-butyl hydroperoxide, cumene hydroperoxide, diisopropyl benzene hydroperoxide, paramethane hydroperoxide, benzoyl peroxide, caprylyl peroxide, di-t-butyl peroxide, ethyl 3,3'-di(t-butylperoxy) butyrate, ethyl 3,3'-di(t-amylperoxy) butyrate, t-amylpeoxy-2-ethylhexanoate, t-butylperoxy pyvalate, and the like, peresters selected from t-butyl peracetate, t-butyl perphthalate, and t-butyl perbenzoate, and the like, percarbonates selected from di(1-cyano-1-methylethyl)peroxy dicarbonate and the like, and the like, but is not limited thereto.

According to an exemplary embodiment of the present disclosure, the initiator may be included at 0.01 to 10 parts by weight, such as 0.01 to 5 parts by weight, with respect to 100 parts by weight of the monomer mixture, but is not limited thereto.

According to an exemplary embodiment of the present disclosure, the inner layer may be included at 20 to 40 wt %, or 25 to 35 wt %, with respect to the total weight of the acrylic copolymer. When the copolymer having a three-layer structure having the inner layer as described above formed is provided, impact resistance is excellent and whitening and a foreign substance are less even when an external force such as flexure is applied.

According to an exemplary embodiment of the present disclosure, the inner layer may further include a grafting agent for improving impact resistance, and the grafting agent may include, specifically, for example, any one or two or more selected from monomers having double bonds with different reactivity from each other and the like such as allyl(meth)acrylate or diallyl maleate, but is not limited thereto. 0.1 to 10 parts by weight of the grafting agent may be further included with respect to 100 parts by weight of the monomer mixture of the inner layer composition, but is not limited thereto.

According to an exemplary embodiment of the present disclosure, the intermediate layer is a layer which coats the inner layer, and may be formed by including an intermediate layer copolymer polymerized from an intermediate layer composition including an acrylate monomer, a methacrylate monomer, an initiator, and a crosslinking agent.

According to an exemplary embodiment of the present disclosure, the kind and content of the acrylate monomer, the crosslinking agent, and the initiator of the intermediate layer composition are as described above. When carrying out, the kind and content used may be the same or different.

According to an exemplary embodiment of the present disclosure, the methacrylate monomer may be C1-C10 alkyl methacrylate, and for example, may be any one or a mixture of two or more selected from methyl methacrylate, ethyl methacrylate, n-butyl methacrylate, t-butyl methacrylate, cyclohexyl methacrylate, 2-ethylhexyl methacrylate, and the like.

According to an exemplary embodiment of the present disclosure, the intermediate layer composition may include 10 to 50 wt % of the acrylate monomer and 50 to 90 wt % of the methacrylate monomer, with respect to the total weight of the monomer. In some embodiments, the intermediate layer composition may include 10 to 30 wt % of the acrylate monomer and 70 to 90 wt % of the methacrylate monomer. When the intermediate layer includes the monomers at the contents described above, bonding strength between the inner layer and the outer layer is excellent, a three-layer structure is formed as such to prevent whitening, and the reduction rate of optical properties is significantly low even with a long-term use to have long-term stability.

According to an exemplary embodiment of the present disclosure, the intermediate layer may be included at 30 to 50 wt %, or 30 to 45 wt %, with respect to the total weight of the acrylic copolymer. When the copolymer having a three-layer structure having the intermediate layer as described above formed is provided, the optical properties and weatherability of a film are improved, so that stable optical properties may be implemented even with a long-term use.

According to an exemplary embodiment of the present disclosure, the intermediate layer may further include a grafting agent for improving impact resistance and is the same kind as those described above, and the same or different materials as/from the inner layer may be included.

According to an exemplary embodiment of the present disclosure, the outer layer is a layer which coats the intermediate layer, and may be formed by including an outer layer copolymer polymerized from an outer layer composition including an acrylate monomer, a methacrylate monomer, a chain transfer agent, and an initiator.

According to an exemplary embodiment of the present disclosure, the kind and content of the acrylate monomer, the methacrylate monomer, and the initiator of the outer layer are as described above. When carrying out, the kind and content used may be the same or different.

According to an exemplary embodiment of the present disclosure, the outer layer forms a three-layer structure by being polymerized without a crosslinking agent, has excellent optical properties and surface smoothness without an additional polymer in molding, and may provide a film having suppressed whitening.

According to an exemplary embodiment of the present disclosure, the outer layer composition may include 10 to 50 wt % of the acrylate monomer and 50 to 90 wt % of the methacrylate monomer, with respect to the total weight of the monomer. In certain embodiments, the outer layer composition may include 10 to 30 wt % of the acrylate monomer and 70 to 90 wt % of the methacrylate monomer. The outer layer is included at the content described above to have excellent bonding strength with the intermediate layer, is formed as an outermost part of the three-layer structure to prevent whitening, and has a significantly low reduction ratio of the optical properties even with a long-term use to have long-term stability.

According to an exemplary embodiment of the present disclosure, the chain transfer agent may be included for securing sufficient flowability with molecular weight adjustment for the purpose of the present disclosure, and specifically, for example, may be selected from alkyl mercaptan having a $C_1$-$C_{12}$ alkyl group and a thiol functional group or polythiol mercaptan having two or more thiol functional groups. The alkyl mercaptan may be any one or a mixture of two or more selected from isopropyl mercaptan, t-butyl mercaptan, n-butyl mercaptan, n-amyl mercaptan, n-octyl mercaptan, n-dodecyl mercaptan, t-dodecyl mercaptan, and the like, but is not limited thereto. The chain transfer agent may be included at 0.001 to 0.5 parts by weight, 0.01 to 0.3 parts by weight with respect to 100 parts by weight of the monomer mixture, but is not limited thereto.

According to an exemplary embodiment of the present disclosure, the outer layer may be included at 30 to 50 wt %, 30 to 45 wt %, with respect to the total weight of the acrylic copolymer. When the copolymer having a three-layer structure having the outer layer as such formed is provided, a film having excellent surface smoothness and a small thickness deviation may be provided.

The acrylic laminate-based film according to the present disclosure is produced from the acrylic copolymer including all of the inner layer, the intermediate layer, and the outer layer as described above, thereby significantly improving optical properties such as a light transmittance and haze, impact resistance, and surface smoothness. In addition, only the acrylic copolymer is used without a need for an additional polymer, thereby preventing whitening caused during a mixing process to provide the film more stably against whitening by flexure. In addition, since a reduction rate of optical properties is significantly low, the film may have long-term stability and durability.

This is an effect which may be expressed from the acrylic copolymer having a three-layer structure described above.

According to an exemplary embodiment of the present disclosure, the acrylic copolymer may have an average particle diameter of 10 to 350 nm. The copolymer may have the average particle diameter of 100 to 300 nm, and 100 to 250 nm, but is not limited thereto. When a film is produced from the acrylic copolymer having the average particle diameter as described above, the acrylic laminate film may be thinner, and an increase in haze is thus prevented, thereby providing a thin film having excellent appearance.

According to an exemplary embodiment of the present disclosure, the inner layer of the acrylic copolymer may have an average distance from a copolymer center to an outer part of the inner layer of 50 to 150 nm, or 50 to 120 nm, but is not limited thereto.

According to an exemplary embodiment of the present disclosure, the intermediate layer of the acrylic copolymer may have an average distance from the outer part of the inner layer to an outer part of the intermediate layer of 30 to 150 nm, or 50 to 120 nm, but is not limited thereto.

According to an exemplary embodiment of the present disclosure, the outer layer of the acrylic copolymer may have an average distance from the outer part of the intermediate layer to an outermost part of 30 to 150 nm, or 50 to 120 nm, but is not limited thereto.

The acrylic copolymer produced so that the distances are described above has better optical properties and also may significantly reduce whitening by flexure.

According to an exemplary embodiment of the present disclosure, the acrylic laminate film may be produced to have a thickness of 10 to 300 m. The thickness may be 50 to 250 m, but is not limited thereto.

According to an exemplary embodiment of the present disclosure, the acrylic laminate film may have a light transmittance of 85% or more, 90% or more, 92% or more, and 95% or more. Specifically, the light transmittance of the laminate-based film, measured after being exposed to a harsh environment of UV 5,000 or more may be reduced at a reduction rate of 20% or less, 15% or less, and 10% or less relative to an initial light transmittance. As such, it was confirmed that by providing the acrylic copolymer having a three-layer structure according to the present disclosure, long-term stability and weatherability are excellent with the low reduction rate of optical properties, even with a long-term use.

In addition, according to an exemplary embodiment of the present disclosure, the acrylic laminate film may satisfy the physical properties of a thickness deviation of 5% or less, -3% or less, and 2% or less. That is, it means that taking a film having a thickness of 60 m as an example, when a thickness is measured at any point for the full width of the film, an error range is within 5%.

In addition, according to an exemplary embodiment of the present disclosure, the acrylic laminate film may have a haze of 2% or less, less foreign substances, and no whitening, thereby showing excellent physical properties to be used as an optical film or a deco sheet. For example, the haze may be 2% or less, specifically 1% or less, more specifically 0.5% or less, and 0.3% or less. The film may satisfy the physical properties of the number of foreign substances of 0.3 or less, 0.2 or less, more specifically 0 to 0.3, and 0.001 to 0.2 per 1 M.

Another exemplary embodiment of the present disclosure is a method for producing an acrylic laminate film including: a) preparing an acrylic copolymer having a three-layer structure of an inner layer, an intermediate layer, and an outer layer and b) molding the acrylic copolymer by melt mixing.

According to an exemplary embodiment of the present disclosure, the acrylic laminate film is produced by using only the acrylic copolymer having a three-layer structure as a polymer and molding the copolymer by melt mixing, thereby significantly reducing haze and whitening while providing excellent optical properties and impact resistance.

According to an exemplary embodiment of the present disclosure, step a) may include a-1) performing emulsion polymerization of an inner layer composition including an acrylate monomer, a crosslinking agent, and an initiator to form an inner layer, a-2) adding an intermediate layer composition including an acrylate monomer, a methacrylate monomer, an initiator, and a crosslinking agent and performing emulsion polymerization to form an intermediate layer which coats the inner layer, and a-3) adding an outer layer composition including an acrylate monomer, a methacrylate monomer, a chain transfer agent, and an initiator and performing emulsion polymerization to form an outer layer which coats the intermediate layer, thereby preparing the acrylic copolymer having a three-layer structure.

According to an exemplary embodiment of the present disclosure, the inner layer composition may further include any one or two or more selected from an aromatic vinyl monomer and a methacrylate monomer.

Specifically, emulsion polymerization for forming the inner layer, the intermediate layer, and the outer layer may be performed by a common method, and in step a-1), the emulsion polymerization is performed by including the inner layer composition and an emulsifier under a nitrogen atmosphere to form the inner layer.

For coating the inner layer, in step a-2), emulsion polymerization is performed by including the intermediate layer composition and the emulsifier under the nitrogen atmosphere to form the intermediate layer.

For coating the intermediate layer, in step a-3), emulsion polymerization including the outer layer composition and the emulsifier is performed under a nitrogen atmosphere to form the outer layer, and then may be subjected to agglomeration, dehydration, and drying.

According to an exemplary embodiment, as the emulsifier, an anionic emulsifier such as alkyl sulfates such as $C_4$-$C_{30}$ alkaline alkyl phosphate, sodium dodecyl sulfate, and sodium dodecylbenzene sulfate may be used, but the present disclosure is not limited thereto. The emulsifier may be included at 0.01 to 5 parts by weight with respect to 100 parts by weight of the monomer mixture in each composition, but is not limited thereto.

According to an exemplary embodiment of the present disclosure, in step b), melt mixing may be performed by further including any one or two or more selected from a filler, a reinforcing agent, a coloring agent, a lubricant, a stabilizer, an antioxidant, a thermal resistant agent, a UV stabilizer, and the like, in addition to the acrylic copolymer. In some embodiments, a UV absorber can be added for imparting weatherability. The kind of UV absorber is not limited, but may be one or a mixture of two or more selected from benzophenone-based compounds, benzotriazole-based compounds, aromatic benzoate-based compounds, oxalic acid anilide-based compounds, cyanoacrylate-based compounds, hindered amine-based compounds, and the like. By using the UV absorber, ultraviolet rays are selectively absorbed from sunlight and decomposition of materials from ultraviolet rays is prevented.

According to an exemplary embodiment of the present disclosure, in step b), molding may be performed by any one or two or more methods selected from a melt casting method, a T-die method, a calendering method, and the like. In order to have low haze and surface smoothness, molding may be performed by a T-die method.

The acrylic laminate film has excellent optical properties and surface smoothness, hardly has whitening, and has excellent properties without deteriorated physical properties even with a long-term use, thereby providing a deco sheet allowing decoration of indoor and outdoor environments such as windows, doors, furniture, and sinks.

When the film is provided as the deco sheet as described above, the deco sheet may be used for a long time, have clearer ornament patterns, and be shown clearer.

Hereinafter, the present disclosure will be described in detail with reference to the Examples. However, they are for describing the present disclosure in more detail, and the scope of the present disclosure is not limited to the following Examples.

In addition, unless otherwise defined, all technical terms and scientific terms have the same meanings as those commonly understood by a person skilled in the art to which the present disclosure pertains. The terms used herein are only for effectively describing a certain exemplary embodiment, and not intended to limit the present disclosure.

Further, unless otherwise stated, the unit of added materials herein may be wt %.

Method of Measuring Physical Properties

1. Light Transmittance(%) and Haze

Measurements were made with Hazemeter in accordance with the test method of ASTM D1003.

2. Elongation (Tensile Elongation) and Tensile Strength

Measurements were made in accordance with the test method of ASTM D638 using a universal testing machine (UTM, Zwick).

A specimen having a width of 10 mm was manufactured and measurement was performed in a machine direction (MD) and a transverse direction (TD) at a tensile speed of 50 mm/min.

3. Pencil Hardness

Measurements were made under a load of 1 kg in accordance with ASTM D 3363.

4. Stress Whitening

A film was bent by being folded at 1800 at room temperature, a whitening state was observed, and classification was as follows:

○: significant whitening

Δ: slight whitening x: no whitening

5. Foreign Material Inspection

Black spots, white spots and the like including foreign substances like dust were detected, and after producing the film, the running film was measured using a film tester from NEXTEYE. It was expressed as the number of foreign substances per 1 M of the film in a length direction, and when one foreign substance occurred during a 10 M run, it was represented as 0.1/1 M.

6. Thickness Smoothness

A film thickness was measured at 50 mm intervals for the full width of a film, and calculated by the following equation:

Thickness deviation (%)=(maximum value of thickness−minimum value of thickness)/minimum value of thickness× 100.

Example 1

As step 1, for forming an inner layer, 250 g of ion exchange water, 0.002 g of ferrous sulfate, 0.008 g of an EDTA·2Na salt, 0.2 g of sodium formaldehyde sulfoxylate, and 2 g of sodium dodecyl sulfate were injected to a 5 L reactor equipped with a stirrer, nitrogen substitution was performed, and then the temperature was raised up to 65° C.

After heating, a mixed solution of 35 g of butyl acrylate, 5 g of styrene, 0.3 g of allyl methacrylate as a grafting agent, 1 g of 1,3-butanediol dimethacrylate as a crosslinking agent, 0.2 g of sodium polyoxyethylene alkyl ether phosphate as an emulsifier, and 0.5 g of cumene hydroperoxide as an initiator was added dropwise for 2 hours, and then emulsion polymerization was performed at 80° C. for 1 hour with stirring at 200 rpm. At this time, the average particle size of the obtained primary particles was 73 nm.

As step 2, for forming an intermediate layer, subsequent to the primary particle copolymer, 0.1 g of sodium formaldehyde sulfoxylate was dissolved in 20 g of distilled water and further added into the reactor. Thereafter, a mixed solution of 9 g of butyl acrylate, 51 g of methyl methacrylate, 0.3 g of allyl methacrylate, 1 g of 1,3-butanediol dimethacrylate as a crosslinking agent, 0.05 g of cumene hydroperoxide, and 0.04 g of dodecyl mercaptan was added dropwise for 2 hours, and then emulsion polymerization was performed at 80° C. for 2 hours with stirring at 500 rpm. At this time, the average particle size of the secondary particle copolymer was 165 nm.

As step 3, in a state of maintaining the temperature at 80° C. for forming an outer layer, 0.1 g of sodium formaldehyde sulfoxylate was added, and then a mixed solution of 51 g of methyl methacrylate, 9 g of methyl acrylate, 1 g of normal octyl mercaptan, and 0.5 g of tertiary butyl peroxide was added dropwise for 2 hours, and then polymerization was carried out at 80° C. for 1 hour. At this time, the average particle size of the obtained acrylic copolymer was 257 nm.

For agglomerating the acrylic copolymer, 0.02 parts by weight of calcium acetate was added with respect to 100 parts by weight of a solid content copolymer and was agglomerated at 70° C., and the thus-obtained copolymer powder was dehydrated in distilled water and then dried at 80° C., thereby obtaining the copolymer.

1.5 parts by weight of Tinuvin 234 as a UV absorber with respect to 100 parts by weight of the acrylic copolymer was mixed therewith and extrusion molding was performed at 260° C. with a T-die extruder to produce an acrylic laminate film of 70 m.

Example 2

The process was carried out in the same manner as in Example 1, except that the film was produced so that the average size of the primary particle copolymer was 171 nm, the average size of the secondary particle copolymer was 222 nm, and the average particle size of the final acrylic copolymer was 262 nm.

Example 3

The process was carried out in the same manner as in Example 1, except that the film was produced so that the average size of the primary particle copolymer was 45 nm, the average size of the secondary particle copolymer was 140 nm, and the average particle size of the final acrylic copolymer was 239 nm.

Example 4

The process was carried out in the same manner as in Example 1, except that the acrylic copolymer was prepared with the intermediate layer composition including 51 g of butyl acrylate and 9 g of methyl methacrylate.

Example 5

The process was carried out in the same manner as in Example 1, except that the acrylic copolymer was prepared with the outer layer composition including 9 g of methyl methacrylate and 51 g of methyl acrylate.

Comparative Example 1

The process was carried out in the same manner as in Example 1, except that step 1 and step 3 were carried out without carrying out step 2 to prepare an acrylic copolymer having a two-layer structure.

Comparative Example 2

The process was carried out in the same manner as in Example 1, except that step 1 and step 2 were carried out without carrying out step 3 to prepare an acrylic copolymer having a two-layer structure.

40 wt % of the prepared acrylic copolymer and 60 wt % of the polymethyl methacrylate were mixed, 1.5 parts by weight of Tinuvin 234 as a UV absorber was mixed therewith, and extrusion molding was performed at 260° C. with a T-die extruder to prepare an acrylic laminate film of 72 m.

Comparative Example 3

The process was carried out in the same manner as in Example 1, except that butyl methacrylate was used as the monomer instead of butyl acrylate of the inner layer composition to prepare an acrylic copolymer.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Light transmittance (%) | | 93 | 91 | 92 | 90 | 91 | 91 | 90 | 91 |
| Haze (%) | | 0.30 | 0.50 | 0.30 | 0.40 | 0.45 | 0.50 | 0.80 | 0.60 |
| Elongation (%) | MD | 125 | 115 | 110 | 120 | 115 | 105 | 100 | 105 |
| | TD | 120 | 110 | 85 | 115 | 90 | 80 | 77 | 82 |
| Tensile | MD | 330 | 276 | 340 | 300 | 310 | 150 | 230 | 270 |

TABLE 1-continued

| | | Example 1 | Example 2 | Example 3 | Example 4 | Example 5 | Comparative Example 1 | Comparative Example 2 | Comparative Example 3 |
|---|---|---|---|---|---|---|---|---|---|
| strength (MPa) | TD | 328 | 251 | 335 | 288 | 291 | 145 | 240 | 245 |
| Pencil hardness | | H | HB | H | B | B | H | HB | H |
| Stress whitening | | x | Δ | x | Δ | Δ | x | ○ | ○ |
| Foreign material inspection | | 0.1 | 0.1 | 0.2 | 0.3 | 0.3 | 0.2 | 0.5 | 0.6 |
| Thickness smoothness (%) | | 1 | 3 | 2 | 4 | 3 | 6 | 8 | 5 |

As shown in Table 1, it was confirmed that the acrylic laminate film produced in the Examples had excellent optical properties and surface smoothness and hardly caused whitening and foreign substances. In addition, it was confirmed that an additional polymer was not needed and even when used for a long time, a reduction rate of optical properties was significantly low, and thus, the film may have long-term stability and durability.

In addition, comparing Examples 1 to 3, it was confirmed that when the acrylic copolymer satisfied 20 to 40 wt % of the inner layer, 30 to 50 wt % of the intermediate layer, and 30 to 50 wt % of the outer layer, 25 to 35 wt % of the inner layer, 30 to 45 wt % of the intermediate layer, and 30 to 45 wt % of the outer layer, better physical properties were implemented, whitening and foreign substance occurrence were suppressed, and surface smoothness was excellent.

In addition, comparing Examples 1, 4, and 5, it was confirmed that when the contents of the monomer in the intermediate layer and outer layer compositions satisfied 10 to 50 wt % of the acrylate monomer and 50 to 90 wt % of the methacrylate monomer, 10 to 30 wt % of the acrylate monomer and 70 to 90 wt % of the methacrylate monomer, whitening, foreign substance occurrence, and surface smoothness were improved, and also, tensile strength, elongation, and pencil hardness were significantly improved.

In addition, when the film was produced by including the acrylic copolymer having a two-layer structure including no intermediate layer as in Comparative Example 1, it was confirmed that low physical properties were implemented as compared with Example 1, and surface smoothness was significantly low.

In addition, when the film was produced by including the acrylic copolymer having a two-layer structure including no outer layer as in Comparative Example 2, it was difficult to produce a film alone, and thus, it was essential to include an additional polymer. Furthermore, it was confirmed that by including the additional polymer, whitening was rapidly increased, foreign substances were produced, and surface smoothness was not good.

In addition, it was confirmed that by preparing the acrylic copolymer by including the methacrylate monomer, not the acrylate monomer in the inner layer as in Comparative Example 3, physical properties were reduced, of course, and whitening was also significantly increased.

Hereinabove, although the acrylic laminate film, the method for producing the same, and the deco sheet produced therefrom have been described in the present disclosure by specific matters and limited exemplary embodiments, the exemplary embodiments have been provided only for assisting in the entire understanding of the present disclosure, and the present disclosure is not limited to the above exemplary embodiments. Various modifications and changes may be made by those skilled in the art to which the present disclosure pertains from this description.

Therefore, the spirit of the present disclosure should not be limited to the above-described exemplary embodiments, and the following claims as well as all modified equally or equivalently to the claims are intended to fall within the scope of the spirit of the disclosure.

The invention claimed is:

1. An acrylic laminate film produced using an acrylic copolymer particle alone, without a mixing process with an additional polymer, the acrylic laminate film having a three-layer structure alone comprising an inner layer, an intermediate layer, and an outer layer,
wherein in the acrylic copolymer, the inner layer includes an inner layer copolymer polymerized from an inner layer composition including an acrylate monomer, a crosslinking agent, and an initiator, the intermediate layer includes an intermediate layer copolymer polymerized from an intermediate layer composition including an acrylate monomer, a methacrylate monomer, an initiator, and a crosslinking agent, and the outer layer includes an outer layer copolymer polymerized from an outer layer composition including an acrylate monomer, a methacrylate monomer, a chain transfer agent, and an initiator.

2. The acrylic laminate film of claim 1, wherein the three-layer structured acrylic copolymer particle includes 20 to 40 wt % of the inner layer, 30 to 50 wt % of the intermediate layer, and 30 to 50 wt % of the outer layer.

3. The acrylic laminate film of claim 1, wherein the inner layer composition further includes any one selected from aromatic vinyl monomers; or methacrylate monomers; or aromatic vinyl monomers and methacrylate monomers.

4. The acrylic laminate film of claim 3, wherein
the inner layer composition includes 100 wt % of the acrylate monomer of the inner layer, or includes 50 to 90 wt % of the acrylate monomer of the inner layer and 10 to 50 wt % of the aromatic vinyl monomer of the inner layer or the methacrylate monomer of the inner layer,
the intermediate layer composition includes 10 to 50 wt % of the acrylate monomer of the intermediate layer and 50 to 90 wt % of the methacrylate monomer of the intermediate layer, and
the outer layer composition includes 10 to 50 wt % of the acrylate monomer of the outer layer and 50 to 90 wt % of the methacrylate monomer of the outer layer.

5. The acrylic laminate film of claim 1, wherein the three-layer structured acrylic copolymer particle has an average particle diameter of 10 to 350 nm.

6. The acrylic laminate film of claim 1, wherein
the inner layer has an average distance from a copolymer particle center of the three-layer structured acrylic copolymer particle to an outer part of the inner layer of 50 to 150 nm, the intermediate layer has an average distance from the outer part of the inner layer to an outer part of the intermediate layer of 30 to 150 nm, and the outer layer has an average distance from the outer part of the intermediate layer to an outermost part of 30 to 150 nm.

7. A deco sheet comprising the acrylic laminate film of claim 1.

8. An acrylic laminate film comprising a three-layer structured acrylic copolymer particle having a three-layer structure of an inner layer, an intermediate layer, and an outer layer, wherein in the acrylic copolymer, the inner layer includes an inner layer copolymer polymerized from an inner layer composition including an acrylate monomer, a crosslinking agent, and an initiator, the intermediate layer includes an intermediate layer copolymer polymerized from an intermediate layer composition including an acrylate monomer, a methacrylate monomer, an initiator, a grafting agent, and a crosslinking agent, and the outer layer includes an outer layer copolymer polymerized from an outer layer composition including an acrylate monomer, a methacrylate monomer, a chain transfer agent, and an initiator, wherein the intermediate layer is included at 30 to 50 wt % with respect to the total weight of the acrylic copolymer particle; and wherein the outer layer is included at 30 to 50 wt % with respect to the total weight of the acrylic copolymer particle.

9. The acrylic laminate film of claim 8, wherein the three-layer structured acrylic copolymer particle includes 20 to 40 wt % of the inner layer.

10. The acrylic laminate film of claim 8, wherein the inner layer composition further includes any one selected from aromatic vinyl monomers; or methacrylate monomers; or aromatic vinyl monomers and methacrylate monomers.

11. The acrylic laminate film of claim 10, wherein the inner layer composition includes 100 wt % of the acrylate monomer of the inner layer, or includes 50 to 90 wt % of the acrylate monomer of the inner layer and 10 to 50 wt % of the aromatic vinyl monomer of the inner layer or the methacrylate monomer of the inner layer, the intermediate layer composition includes 10 to 50 wt % of the acrylate monomer of the intermediate layer and 50 to 90 wt % of the methacrylate monomer of the intermediate layer, and the outer layer composition includes 10 to 50 wt % of the acrylate monomer of the outer layer and 50 to 90 wt % of the methacrylate monomer of the outer layer.

12. The acrylic laminate film of claim 8, wherein the three-layer structured acrylic copolymer particle has an average particle diameter of 10 to 350 nm.

13. The acrylic laminate film of claim 8, wherein the inner layer has an average distance from a copolymer particle center of the three-layer structured acrylic copolymer particle to an outer part of the inner layer of 50 to 150 nm, the intermediate layer has an average distance from the outer part of the inner layer to an outer part of the intermediate layer of 30 to 150 nm, and the outer layer has an average distance from the outer part of the intermediate layer to an outermost part of 30 to 150 nm.

* * * * *